June 23, 1959 — C. H. KNIGHT — 2,891,846
FURNACE STRUCTURE
Filed Jan. 23, 1956 — 2 Sheets-Sheet 1

INVENTOR.
CYRIL H. KNIGHT
BY William J. Fox,
attorney

June 23, 1959  C. H. KNIGHT  2,891,846
FURNACE STRUCTURE

Filed Jan. 23, 1956  2 Sheets-Sheet 2

INVENTOR.
CYRIL H. KNIGHT
BY William J Fox,
attorney.

United States Patent Office 2,891,846
Patented June 23, 1959

2,891,846
FURNACE STRUCTURE

Cyril H. Knight, Woodbridge, Ontario, Canada, assignor to Dorr-Oliver Incorporated, Stamford, Conn., a corporation of Delaware Application January 23, 1956, Serial No. 560,810
2 Claims. (Cl. 23—284)

This invention relates to furnace structures and is of especial significance when applied to reactors for treating finely-divided solids in accordance with the so-called fluidized-solids technique.

Typically a fluidized solids reactor comprises a vessel having a substantially horizontal plate which supports a bed of finely divided solids in the reaction chamber and which usually embodies means through which fluidizing and/or treatment gas is caused to flow. In many instances a single reactor is subdivided by vertically spaced bed support plates into a plurality of reaction chambers.

For high temperature operations such, for example, as calcination, sulphide roasting iron ore reduction and the like, and particularly where exothermic reactions are involved, the reaction chamber must be refractory lined to withstand heat. This, having regard to the loads involved in supporting beds of material which is rather weighty, sets an upper limit on the cross-sectional area of the reaction chamber because self-supporting refractory arches, such as are required for the roof structure and bed support plates become unwieldy, expensive and generally impracticable beyond a certain size. To date a practical limit of about twenty-five feet has been placed on the diameter of cylindrical vessels.

In some processes it is necessary to introduce into the fluidized bed fuel, coolant, treatment gases, etc., and it is important that they penetrate throughout the whole area of the bed as uniformly as possible. That again limits the cross-sectional area as it is not always easy to attain proper vertical and lateral dispersion through the bed.

The aforementioned difficulties, though perhaps of special significance in connection with fluidized solids reactors, are also encountered, possibly with other difficulties as well, in shaft kilns and furnaces generally. It is, therefore, to be appreciated that the present invention is not restricted to fluidized solids reactors, but is equally applicable to furnaces, shaft kilns and like devices.

It is an object of the present invention to provide a reactor or furnace structure which overcomes the limitations of present designs, and which provides for the handling of loads considerably in excess of the loads hitherto possible in a single reactor.

Another object of the invention is to facilitate penetration of the bed with fuel, coolant or other treatment materials.

The above and other desirable objects are, according to the present invention, achieved by constructing the furnace or reactor as a structure having a substantially central pillar with the bed support plate or plates extending between such pillar and the outer walls of the structure. The structure is preferably circular or oval because such structures are substantially self-bracing, but there is of course no reason to exclude other shapes from the scope of the invention in its broadest aspect.

The bi-lateral support for the bed supports and such other refractory arches as are necessarily employed, makes it possible to construct a furnace or reactor of large cross-sectional area with consequently large capacity, and thus avoids the size limitations which have hitherto hindered the utilization of large capacity furnaces, reactors, kilns and the like.

The construction also makes possible the utilization of both the outer wall of the structure and the inner pillar as a means for supporting such instrumentation as injecting devices for injecting fuel, coolant and other treatment fluid, manometric devices, heat exchangers, temperature measuring devices, and the like. The bi-lateral injection of fuel, coolant or other treatment fluid ensures excellent penetration throughout the whole area of the bed and such other instrumentation as heat exchangers, measuring devices and the like become more accurately representative of the conditions prevailing in the bed.

The obstruction provided within the structure by the central pillar presents an added advantage of considerable significance in fluidized solids reactors. In that respect it is customary to maintain the fluidized bed levels by feeding the materials to be reacted downwardly into the bed by means of a downwardly directed inlet conduit terminating but a short distance above the bed support plate, and to discharge reacted solids by overflow through a conduit having its inlet dispersed at a height above the bed support plate corresponding to the desired bed depth. It will be appreciated, that by angularly spacing the inlet and discharge conduits about one hundred and eighty degrees, the pillar operates as an effective obstruction in that it compels the incoming solids to travel around in the bed for a substantial distance before reaching the outlet conduit, thus minimizing any tendency of the incoming feed solids to short-circuit the bed by passing out through the overflow discharge conduit before completing the time residence in the bed which is necessary for them to be fully reacted.

The invention further contemplates the division of the bed by a vertical partition extending between closely spaced inlet and outlet conduits, whereby the incoming solids are caused to travel around the pillar through nearly a full circle before reaching the overflow discharge conduit.

In order that it may be clearly understood, the invention will now be described by way of example, with reference to the accompanying drawings in which.

Figure 1:
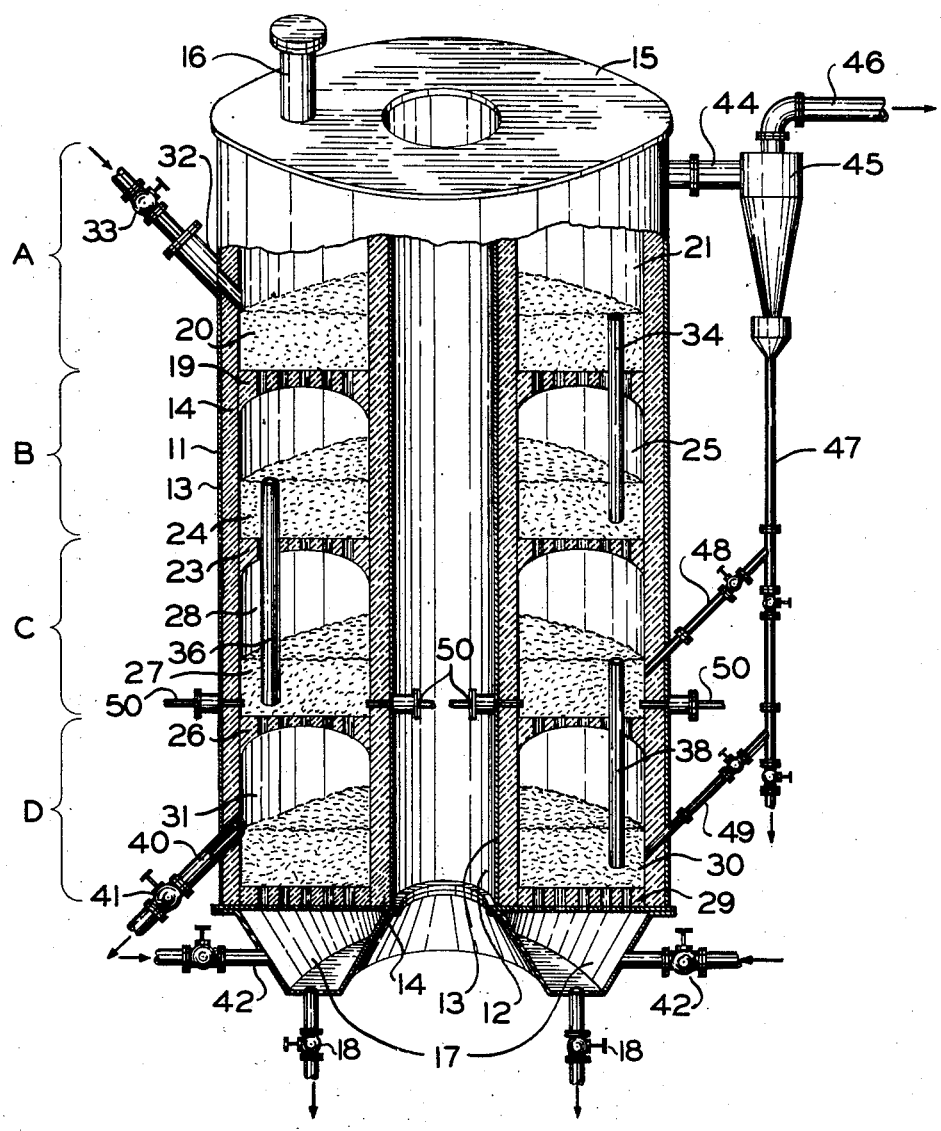
Figure 1 is a perspective view, mainly in cross-section, showing a multi-compartment fluidized solids reactor constructed in accordance with the present invention.

Referring now to Figure 1, the reactor is of annular form, having an outer wall 11 and, substantially centrally thereof, an internal pillar structure defined as a hollow cylindrical wall 12, the annular form being defined by steel shells 13 lined with refractory material 14. The reactor has a top 15 with a gas stack 16 and an annular windbox 17 equipped with cleanout valves 18 and fluidizing gas supply conduits 42.

The reactor is divided into four superimposed compartments A, B, C and D. The vertical extent of zone A is defined downwardly by an apertured arched self-supporting refractory bed support plate 19, and upwardly by the top of the reactor. The plate 19 supports a bed 20 of solids above which is a freeboard space 21. Similar apertured refractory bed support plates 23, 26 and 29 support the respective beds 24, 27 and 30 in the respective zones B, C and D. The reference numerals 25, 28 and 31 indicate the freeboard spaces above the respective bed levels.

Solids to be treated are fed into the reactor via a feed inlet conduit 32 equipped with a control valve 33. The feed solids enter the top bed 20 from whence they overflow through a conduit 34 after having travelled around the annular bed 20 to the position of the conduit 34. Solids transferred from this top bed 20 to the next bed 24 work their way around the latter bed 24 and overflow therefrom to the next lower bed 27 through a conduit 36. The solids entering the latter bed 27 likewise progress around the bed to an overflow conduit 38 through which they flow to the next subjacent bed 30. Solids transferred into this lowermost bed 30 are removed therefrom, after progressing around the bed, by flowing through a discharge conduit 40 which has an adjustable valve 41. Each bed of the reactor may be equipped with a clean out valve.

Fluidizing gas is admitted to the reactor through valved supply conduits 42 into an annular windbox 17. This gas passes successively upwardly through the four beds of the reactor and eventually leaves the reactor via a gas outlet conduit 44. As this exiting stream of gas contains entrained dust it is passed directly into a dust collection station 45 where the dust and gas are separated. The dust-free gas is discharged via a conduit 46 for further cleaning, processing or to waste, while the separated dust is discharged via a tailpipe 47 for discharge from the system or into either of two conduits 48 and 49 which convey the solids either into next lowest bed 27 or the lowermost bed 30. All of these conduits are suitably valved to give any distribution desired.

In starting up the reactor it is necessary to add heat in order to reach reaction temperature. If the reaction is exothermic at reaction temperature no further heat will be required as long as the feed and gas supply are properly regulated. If the reaction being carried out is an endothermic one, e.g. calcination, fuel will have to be constantly supplied during operation. Such fuel as is required can be supplied through the injectors 50. Initially the fuel has to be ignited for starting up, but generally, after the reactor has attained its operating temperature any heat required thereafter is supplied by the combustion of added fuel.

As is clear from Figure 1, the central structure defined by the inner wall 13, as well as the roof structure 15 and the windbox 17 are left open at the center, and, though such is not absolutely necessary, it is convenient and certainly preferable in order to give access to such instrumentation as is carried by the inner structure, while furthermore, in large reactors the diameter of the inner structure can be large enough for an operator to negotiate and therefrom to gain access through suitably arranged furnace doors to the interior of the reaction chambers for servicing and repair work when the reactor is shut down.

Fluidization of the beds is effected by flowing the fluidization gas upwardly from the windbox at fluidizing velocity and, if necessary, supplementary fluidizing gas can be supplied to the upper reaction chambers. Preferably the bed levels are maintained by continuous feed and overflow discharge, and the reaction time residence of the bed solids is determined by the incoming feed rate.

The invention though illustrated and more particularly described in relation to a multi-chamber reactor is equally applicable to nisgle compartment reactors.

Figure 2:
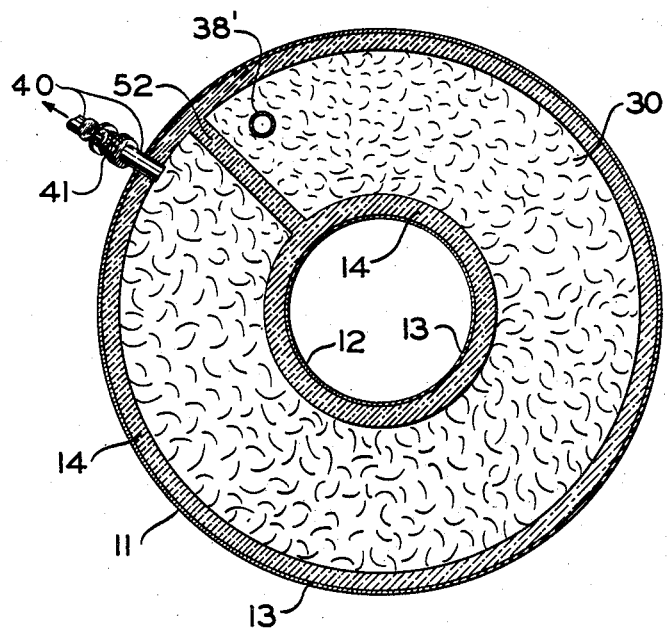
Figure 2 is a cross-section taken horizontally through a reactor generally similar to that of Figure 1, but embodying a slight modification.

Figure 2 can be regarded as a section taken through the bottom zone (zone D) of a reactor which generally and particularly externally, bears a close resemblance to that shown in Figure 1. Thus in Figure 2 the reference numeral 11 represents the reactor wall generally, 12 the inner wall generally, 13 the steel shells, 14 the refractory lining, 30 the bed in zone D, 40 the final overflow discharge conduit and 41 its control valve, all corresponding to the showing in Figure 1. Figure 2, however, differs from Figure 1 in that Figure 2 shows a partition 52 and a somewhat different disposition of the down flow conduit, there represented by the reference numeral 38'. In this case the downflow conduit 38' is angularly spaced only a short distance from the overflow conduit 40, but the partition 52 isolates the conduits one from the other with the result that solids entering the bed through the conduit 38' are compelled to circumnavigate the central structure before reaching the overflow conduit 40. This arrangement positively prevents the solids short circuiting the bed, and, in a multi-chamber reactor, any one or more of the compartments can be so partitioned.

In construction the lining wall 14 and the arches 19, 23 and 26 can be built up in situ of fire-brick or other suitable blocks, adjacent blocks interfitting or having cooperatively inclined faces whereby the bed support plates comprise self-sustaining arch structures. The blocks which constitute the internal and external boundaries of the bed support plates can be initially supported on flanges provided on the steel shells 13, such flanges in the finished structure being enclosed by the firebrick.

The blocks which constitute the bed support plates are perforated approximately to provide for through passage of the fluidizing and/or treatment gas, and in some cases it may be desirable to provide tuyeres extending through the blocks for gas passage and distribution.

It will be noted that in the construction shown in Figure 1 the fuel injection devices 50 are provided only in zone C, which thus is the roasting zone. In such an arrangement zones A and B are preheating zones and zone D is a cooling zone, however, injecting devices may be provided for introducing fuel, coolant or other material into any or all of the zones.

I claim:

1. Apparatus for the treatment of finely divided solids under solids fluidizing conditions comprising an outer substantially cylindrical sidewall and an inner substantially cylindrical sidewall axially positioned within said outer sidewall, said inner and said outer sidewalls being oriented with their axis extending in a vertical direction, the area within the interior diameter of said inner side wall being adapted to receive fuel burners and pressure and temperature sensing devices; annular bed plate means for supporting finely divided solids and adapted to permit the passage of fluidizing gases therethrough, said bed plate means extending from the inside surface of said outer wall to the outside diameter of said inner wall and supported therebetween; baffle means extending upwardly from said bed plate means and attached to the inner diameter of said outside wall and the outside diameter of said inner wall, means for introducing finely divided solids to be treated adjacent one side of said baffle means and means for withdrawing solids adjacent the other side of said baffle means; means for introducing fluidizing gases beneath said bed plate.

2. Apparatus according to claim 1 in which a plurality of said bed plate means are superposed within said outer and inner sidewalls and means for discharging finely divided solids sequentially from a point adjacent above the uppermost of said bed plates to a point adjacent above the next lower bed plate.

References Cited in the file of this patent

UNITED STATES PATENTS

| | | |
|---|---|---|
| 1,953,372 | Stillger | Apr. 3, 1934 |
| 2,198,795 | Titlestad | Apr. 30, 1940 |
| 2,475,822 | Cummings | July 12, 1949 |
| 2,501,695 | Sensel | Mar. 28, 1950 |
| 2,529,366 | Bauer | Nov. 7, 1950 |
| 2,540,706 | Beck | Feb. 6, 1951 |
| 2,548,519 | Cummings | Apr. 10, 1951 |
| 2,595,384 | Johnson | May 6, 1952 |
| 2,635,949 | Fenske | Apr. 21, 1953 |
| 2,596,954 | Heath | May 13, 1954 |
| 2,719,818 | Findlay | Oct. 4, 1955 |
| 2,750,258 | Jukkola | June 12, 1956 |

FOREIGN PATENTS

| | | |
|---|---|---|
| 6,026 | Great Britain | Nov. 4, 1915 |